Dec. 29, 1953      M. LANG      2,664,453
BATTERY ELECTRODE
Filed Nov. 15, 1946
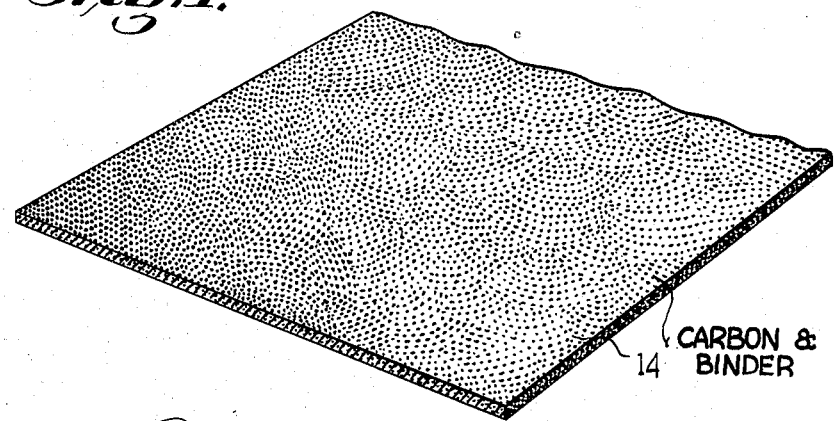
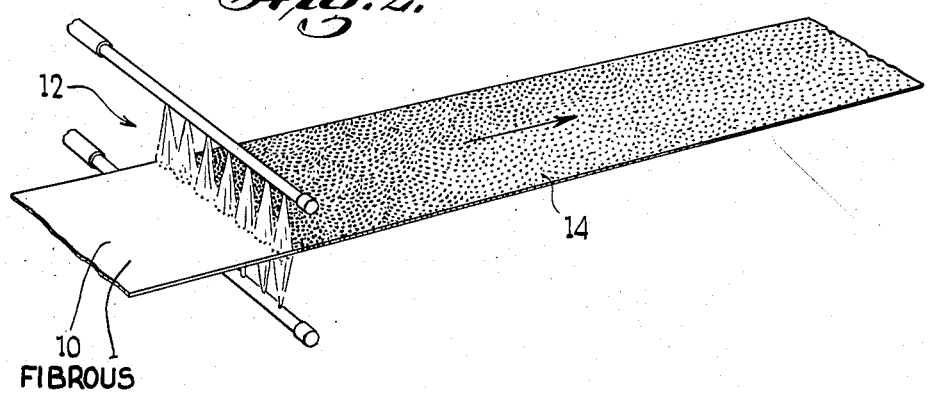
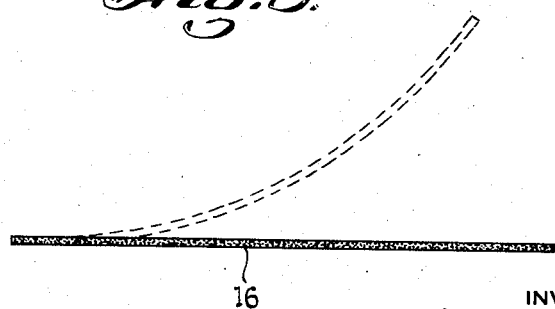
INVENTOR
MAURICE LANG
BY
ATTORNEY Patented Dec. 29, 1953

2,664,453

UNITED STATES PATENT OFFICE 2,664,453

BATTERY ELECTRODE

Maurice Lang, Brooklyn, N. Y., assignor to
Henry Hyman, New York, N. Y.

Application November 15, 1946, Serial No. 710,024

1 Claim. (Cl. 136—121)

This invention relates to batteries. More particularly, the invention pertains to carbon electrodes for batteries and to a method for making the same.

The actual carbon electrodes shown and described in the instant application are specifically designed for use in pack batteries, but it is to be understood that this particular embodiment of the invention is given by way of example only and is not to be interpreted as limitative.

It is a primary object of the invention to provide a carbon electrode of the plate type which is not easily broken either during handling or when, after incorporation in a pack battery, the stack of cells is compressed.

It is another object of the invention to provide a carbon electrode of the character described which does not abrade to any appreciable extent, so that even after the same has been rubbed against other electrodes during handling and storage, it still will be of full size and thickness when used.

It is a further object of the invention to provide an electrode of the character described which can be manufactured very inexpensively.

It is an additional object of the invention to provide a method of making an electrode of the character described which comprises relatively few and simple steps and which may be practiced efficiently even by unskilled labor.

Other objects of this invention will in part be obvious and in part be hereinafter pointed out.

The invention accordingly consists in the features of construction, combinations of elements, arrangement of parts and performance of operations which will be exemplified in the construction and method hereinafter described and of which the scope of application will be indicated in the appended claim.

In the accompanying drawings in which is shown one of the various possible embodiments of the invention, Fig. 1 is a perspective view of a fragment of an electrode embodying and made in accordance with the present invention;

Fig. 2 is a schematic perspective view which is illustrative of the method of manufacturing said electrode; and Fig. 3 is an edge view of the electrode, illustrating in dotted lines the manner in which the same can be flexed.

Referring now in detail to the drawings, an electrode embodying the invention constitutes a sheet 10 of fibrous water permeable material such for example as cloth or unglazed paper. This sheet is treated with a liquid including a fluid carrier, a solid binder soluble in the carrier and particles of a carbonaceous conducting material, preferably in a finely comminuted state. More specifically, the solid binder may comprise any one of the well known film forming plastics, for instance vinyl chloride. The carrier may comprise hexone in which the vinyl chloride is soluble and the carbonaceous material may comprise carbon black or graphite particles. Said constituents are thoroughly agitated until a smooth mixture is formed in which the carbonaceous particles are uniformly dispersed.

Any suitable method of application may be used to treat the sheet with the foregoing liquid. For instance, the sheet may be submerged in the liquid, or the liquid may be brushed on to the sheet, or the sheet may be coated as with a knife. Still another method, and that illustrated herein, is to apply the liquid to the sheet by spraying as shown at 12.

It will be understood by those skilled in the art that the amount of fluid carrier employed will vary in accordance with the method of application of the liquid; that is to say, more of the fluid carrier ordinarily will be used in case the liquid is sprayed and less where the sheet is submerged in the liquid.

Any suitable proportion of binder and carbonaceous material can be employed and one ratio which secures good results is fifty parts by weight of the solid binder to fifty parts by weight of the carbonaceous material.

A sheet treated in the foregoing manner will, upon evaporation of the fluid carrier, retain a deposit of the solid binder through which the particles of the carbonaceous material are uniformly dispersed. The sheet is treated to a sufficient extent to render the same liquid impermeable and the number of applications of the liquid will be governed by this criterion. Some sheets, as for example, thin soft sheets of paper may require two or even three applications of the carbonaceous liquid before they become liquid impermeable. On the other hand a relatively heavy sheet of linen may require only one application of the carbonaceous liquid to become liquid impermeable.

The liquid penetrates the sheet and either soaks into the individual fibres or coats the same, depending upon the condition thereof, so that, after a sufficient number of applications, the sheet will be impregnated with a deposit composed of the solid film-forming binder through which carbonaceous particles are uniformly and heavily distributed. Due to the nature of the binder said deposit will be a thin coherent mass, that is to say, a layer rather than separate uncoalesced grains; and, because the sheet is impregnated with the deposit, said layer will fill all the interstices of the sheet, and be imperforate and coextensive with the sheet. Thus the layer will extend from face to face of the sheet and, in effect, be reinforced by the sheet. Such a layer will have a relatively low electrical resistance and can serve as the carbon electrode of a dry (Le Clanche) battery.

It will be understood that the solid binder material employed is inert to the chemicals forming the battery (particularly the electrolyte) and to the gaseous and liquid battery decomposition products. It should also be mentioned that the deposited layer is only impermeable to liquids like water which do not physically or chemically affect it, and that the term "impermeable" as used herein does not embrace liquids such for instance as hexone, capable of dissolving said layer.

The reference numeral 14 indicates a sheet of paper treated in accordance with the instant invention and impregnated by saturation in the manner above described with carbonaceous particles and a solid water impervious and water insoluble binder.

After the sheet has been treated, the fluid carrier evaporated, and the binder set hard, plates 16 of the desired size are cut from the sheet, as with a punch. These plates may be readily flexed as indicated by the dotted lines in Fig. 3 without breaking or mutilating the same. If desired, evaporation may be accelerated by heating or drying in a partial vacuum.

It will thus be seen that there is provided a flexible carbon plate electrode and a method for making the same which achieve the several objects of the invention and are well adapted to meet the conditions of practical use.

Since various possible embodiments might be made of the above invention, and since various changes might be made in the embodiment above set forth, it is to be understood that all matter herein described or shown in the accompanying drawings is to be interpreted as illustrative and not in a limiting sense.

Having thus described the invention, there is claimed as new and desired to be secured by Letters Patent:

A flexible water impermeable carbon plate electrode comprising a coherent sheet of a fibrous liquid permeable material impregnated from face to face with an imperforate coherent layer of polymerized vinyl chloride which is coextensive with the sheet and fills the interstices thereof, said polymerized vinyl chloride having carbonaceous particles of a graphitic nature uniformly distributed therethrough, said particles being present in an amount by weight equal to the amount by weight of the polymerized vinyl chloride so that said layer has a low electrical resistance.

MAURICE LANG.

References Cited in the file of this patent

UNITED STATES PATENTS

| Number | Name | Date |
| --- | --- | --- |
| 1,649,579 | Edison | Nov. 15, 1927 |
| 1,910,391 | Howard et al. | May 23, 1933 |
| 2,275,281 | Berl | Mar. 3, 1942 |
| 2,306,408 | Ruben | Dec. 29, 1942 |
| 2,416,579 | Franz et al. | Feb. 25, 1947 |
| 2,594,047 | Martinez | Apr. 22, 1952 |

FOREIGN PATENTS

| Number | Country | Date |
| --- | --- | --- |
| 222,793 | Switzerland | Nov. 2, 1942 |